United States Patent [19]

Uetani et al.

[11] 4,238,555
[45] Dec. 9, 1980

[54] LEAK-PROOF ALKALINE CELL AND ITS PRODUCTION

[75] Inventors: Yoshio Uetani, Ibaraki; Yasuyoshi Taniguchi, Hirakata; Kenichi Yokoyama, Takatsuki; Seiichi Matsushima, Shinsenrinishi; Sonae Kirihara, Sawaraginishi, all of Japan

[73] Assignee: Hitachi Maxell, Ltd., Osaka, Japan

[21] Appl. No.: 56,325

[22] Filed: Jul. 10, 1979

[30] Foreign Application Priority Data

Jul. 10, 1978 [JP] Japan .................................. 53-84436

[51] Int. Cl.³ .......................................... H01M 2/00
[52] U.S. Cl. .................................... 429/163; 429/170; 429/174; 429/185
[58] Field of Search ................................ 429/170-177, 429/133, 162, 163, 122, 185, 181, 180

[56] References Cited

U.S. PATENT DOCUMENTS

| | | | |
|---|---|---|---|
| 3,673,000 | 6/1972 | Ruetschi | 429/174 |
| 3,905,835 | 9/1975 | Kasai | 429/206 |
| 3,990,916 | 11/1976 | Sugimoto | 429/206 X |
| 4,041,219 | 8/1977 | Nishimura | 429/206 X |
| 4,121,021 | 10/1978 | Ogawa et al. | 429/162 |
| 4,128,705 | 12/1978 | Winsel | 429/171 |

*Primary Examiner*—Anthony Skapars
*Attorney, Agent, or Firm*—Birch, Stewart, Kolasch & Birch

[57] ABSTRACT

A leak-proof alkaline cell comprising a positive can, a negative cap having a turned-up portion, said cap being fitted at the open end of the positive can and a gasket provided between the positive can and the negative cap, the rim of the positive can being crimped inwardly so as to press the gasket to the negative cap, the negative cap being made of a metal plate laminated with a copper layer which is adapted to be contacted with a negative electrode active material mix and the copper layer also extending to the outer surface of the negative cap facing the gasket, characterized in that the copper layer is eliminated at the ultimate terminal edge of the turned-up portion.

9 Claims, 8 Drawing Figures

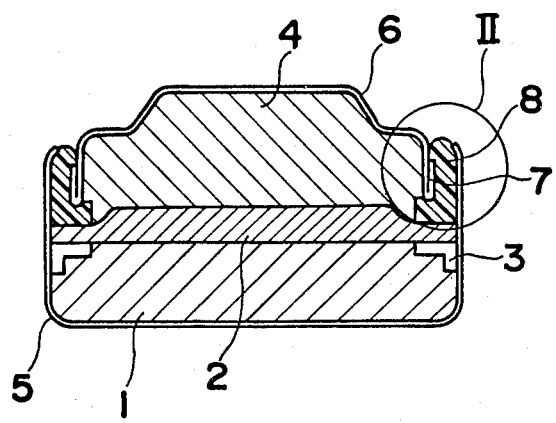
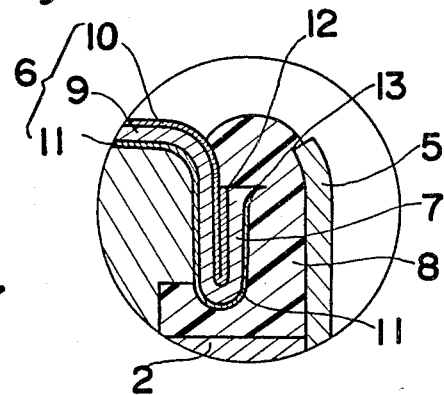
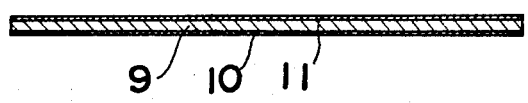
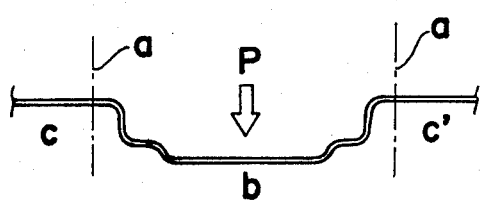
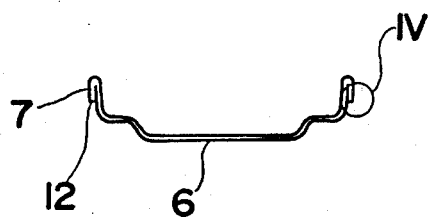
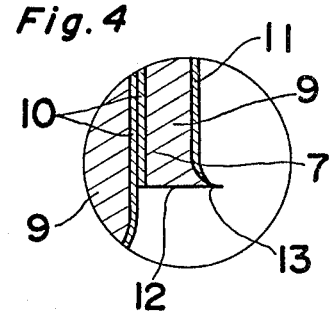
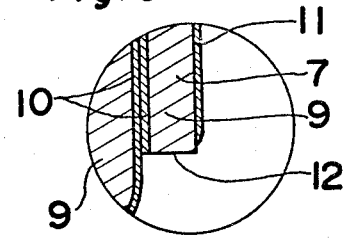
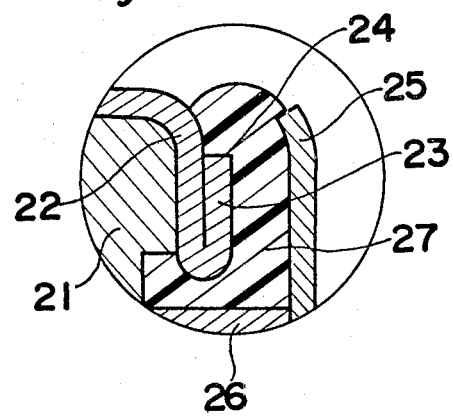

LEAK-PROOF ALKALINE CELL AND ITS PRODUCTION

The present invention relates to a leak-proof alkaline cell and its production.

In general, the leakage of an electrolyte from an alkaline cell such as a silver oxide cell or a manganese dioxide cell is prevented by providing a gasket made of an elastic material such as rubbers (e.g. butyl rubber, silicone rubber), polyamides or polyolefins (e.g. polyethylene, polypropylene) at the open end of a positive can and then crimping the rim of the positive can inwardly so as to press the gasket to a negative cap, normally made of a clad plate consisting of a steel plate as the substrate having a copper layer at the inner surface to be contacted with a negative electrode material mix (and a nickel layer at the outer surface to be exposed to atmosphere). In this type of sealing, as shown in FIG. 6 of the accompanying drawings, the outer circumferential edge of the negative cap on the turned-up portion is pressed against the gasket to prevent leakage. When pressing is insufficient, leakage from the contact surface between the gasket and the negative cap is likely to occur.

In order to efficiently prevent leakage of an electrolyte from the contact surface between the gasket and the negative cap, an extensive study has been made. As the result of the study, it has been found that when the copper layer at the surface of the negative cap is eliminated at the terminal edge portion of the rim of the negative cap so as to make the steel plate bare, the leakage preventing effect of the gasket is highly enhanced. This is probably due to the concentration of the tightening power into the terminal edge portion where the steel plate, which is harder than the copper layer, is made bare. In this connection, it may be noted that the elimination of the copper layer is expected to result in unfavorable formation of a local cell between the steel plate and a zinc active material, which may produce hydrogen gas and lead to the leakage of the electrolyte, but such unfavorable result can be substantially avoided by tapering the copper layer nearly to the terminal edge portion. The present invention is based on the above finding.

The details of construction of an alkaline cell made in accordance with the present invention, and various features of the cell, are more fully explained in the following descriptions, taken together with the accompanying drawings, in which:

FIG. 1 is a sectional view of a button type alkaline cell as an embodiment of the invention;

FIG. 2 is an enlarged sectional view of the cell at the part II in FIG. 1;

FIG. 3 (A) to (C) are sectional views for illustration of how to prepare a negative cap as an embodiment of the invention with a clad plate;

FIG. 4 is an enlarged sectional view of the negative cap at the part IV in FIG. 3 (C);

FIG. 5 is an enlarged sectional view of a part of a negative cap as another embodiment of the invention; and, FIG. 6 is an enlarged sectional view of a part of a conventional button type alkaline cell.

In FIGS. 1 and 2, 1 is a positive depolarizing mix comprising a positive active material (e.g. silver(I) oxide, manganese dioxide, silver(II) oxide, mercury oxide), with or without an electro-conductive material (e.g. carbon black, graphite), and an alkaline electrolyte (e.g. 25 to 40% (w/w) aqueous solution of KOH, 20 to 30% (w/w) aqueous solution of NaOH) absorbed therein. The weight ratio of the positive active material and the electro-conductive material may be from 100:0 to 80:20. A separator 2, which comprises a microporous film imparted a hydrophilic property (e.g. polypropylene film), a cellophane film and an absorptive layer made of vinylon-rayon mixed paper, is brought into contact with the positive depolarizing mix 1 and a metallic pedestal 3 made of iron, nickel or stainless steel and fixed on the periphery of the positive depolarizing mix; 4 is a negative electrode material mix comprising amalgamated zinc, optionally with a gelling agent (e.g. sodium polyacrylate, carboxymethyl cellulose, starch) and the electrolyte; and 5 is a positive can made of nickel-plated steel, into which the positive depolarizing mix 1 and the separator 2 are accommodated. At the opening part of the positive can 5, a negative cap 6 having a turned-up portion 7 is fitted with intervention of an annular gasket 8 made of an elastic material such as rubbers, polyamides and polyolefins and having a section of L-letter shape, and the rim of the positive can 5 is inwardly crimped to close tightly the contents of the cell.

The negative cap 6 is constructed with a steel plate 9 about 180 microns thick having a nickel layer 10 about 20 microns thick at the outer surface for assuring a good appearance as well as a corrosion resistance and a copper layer 11 about 50 microns thick at the inner surface for preventing the formation of a local cell between the steel plate and a zinc active material. The copper layer 11 at the terminal edge of the turned-up portion 7 of the negative cap 6 is eliminated so as to expose the steel plate 9 (cf. FIG. 2). The term "copper layer" as hereinbefore and hereinafter mentioned is intended to mean a layer made of copper or its alloy.

The negative cap 6 may be prepared by a simple procedure as shown in FIGS. 3 and 4. For instance, a clad plate consisting of a stainless steel plate 9 as the substrate having a nickel layer 10 and a copper layer 11 (cf. FIG. 3 (A)) is pressed by draw forming in multiple steps and then stamped out at the positions indicated by dotted lines (a), (a) in the same direction as or the opposite direction to that as shown by an arrow line P (i.e. pressing direction) (cf. FIG. 3 (B)). During stamping, a burr is formed at the stamped edge 12 along the stamped direction. The rim portion of the resultant material is folded at the terminal portion to make a turned-up portion 7 (cf. FIG. 3 (C)). On this folding, the burr 13 formed by stamping out in the opposite direction to the pressing direction is outwardly projected (cf. FIG. 4). The terminal edge portion can be sharpened by eliminating the copper layer 11 near the burr 13 to make an acute angle (cf. FIG. 2).

In general, the surface of the negative cap 6 is roughened as a result of the above processing. Particularly, the surface of the copper layer around the turned-up portion shows a roughness of about 4 to 7 microns, which is rougher in comparison with the roughness (e.g. about 1 micron) before the processing. For assuring a tight contact with the gasket, the surface of the negative cap which is to be brought into contact with the gasket is preferably polished uniformly. Further, the thickness of the copper layer near the burr 13 is very small as the result of the processing such as draw forming and stamping out.

For polishing the roughened surface of the negative cap at the turned-up portion so as to make it flat and smooth, chemical polishing may be used. According to such chemical polishing, the copper layer is eliminated at the said part of small thickness, whereby the steel plate as the substrate at the terminal edge portion is exposed. The exposed steel plate 9 is relatively inactive to a polishing agent such as hydrogen peroxide-sulfuric acid and thus kept as such.

The composition of the polishing solution as well as the temperature and time for polishing may be appropriately decided. When, for instance, a polishing solution comprising hydrogen peroxide in a concentration of about 0.7 to 22.8% by weight with sulfuric acid, ethanol and the like in concentrations of several % is used, the negative cap having a copper layer made of pure copper may be treated at a temperature of about 40° to 60° C., and the one having a copper layer made of brass may be treated at a temperature of about 30° to 50° C. Under the constant temperature, the treatment time may be decided with variation of the hydrogen peroxide concentration.

As a result of the above polishing procedure, there is obtained a negative cap of which the steel plate as the substrate is exposed at the terminal edge portion. The copper layer on the steel plate as the substrate is extended nearly to the terminal edge portion with small tapering.

On sealing of an alkaline cell by crimping inwardly the rim of the open end of a positive can so as to press a gasket towards the turned-up portion of a negative cap, the tightening power is concentrated onto the terminal edge portion of the negative cap brought into contact with the gasket, said terminal edge portion being exposed by chemical polishing. The terminal edge portion can intrude into the gasket so as to assure the prevention of leakage of an electrolyte. Since the copper layer extends nearly to the terminal edge portion so as to cover the substrate (e.g. steel) which is harder than copper, the formation of a local cell between the substrate and the zinc active material is substantially prevented, and a good leak-proof property can be maintained.

In general, a negative cap of this kind has a turned-up portion of about 0.35 to 1.33 mm, and therefore the elimination of the copper layer may be effected about 0.1 to 0.5 mm from the terminal edge portion.

In case of the preparation of a negative cap as illustrated in FIG. 3, the stamping out in the same direction as shown in an arrow line P (cutting down the parts (c), (c') in the arrow direction under the fixation of the part (b)) affords a turned-up portion having an opposite direction burr at the terminal edge portion. When a negative cap is provided with a burr 13 at the terminal edge portion 12 on the turned-up portion 7 (cf. FIG. 4) and the copper layer at the terminal edge portion is eliminated (cf. FIG. 2), the terminal edge portion 12 can intrude into the gasket 8 firmly on the crimping of the rim of the positive can 5 inwardly so that the leak-proof property is enhanced.

If desired, there may be adopted additionally any procedure for enhancing the leak-proof property such as application of asphalt-pitch to the contact faces between the gasket and the positive can and between the gasket and the negative cap and treatment of the negative cap with a benzotriazole compound to form a film at the surface of the negative cap to be brought into contact with the gasket.

Practical and presently preferred embodiments of the present invention are illustratively shown in the following Examples wherein part(s) and % are by weight unless otherwise instructed.

EXAMPLE 1

A clad plate consisting of a stainless steel plate about 180 microns thick as the substrate having a nickel layer about 20 microns thick on one of the surfaces and a copper layer about 50 microns thick on another surface (cf. FIG. 3 (A)) was subjected to draw forming to make a shape having a section as shown in FIG. 3 (B) and stamped out at the position indicated by a dotted line a in the same direction as shown by an arrow line P. Thereafter, the edge portion was folded as shown in FIG. 3 (C) to make a turned-up portion whereby a negative cap (A) was obtained.

The negative cap (A) was put in a polishing solution comprising hydrogen peroxide (11.4%), sulfuric acid (4%) and ethanol (5%) in water heated up to 50° C. for 1 minute under stirring, taken out therefrom and then washed with water, whereby the copper layer at the ultimate edge on the turn-up part was eliminated to give a negative cap (B), of which the ultimate terminal edge was as shown in FIG. 5.

EXAMPLE 2

Example 2 was conducted in the same manner as in Example 1, but the stamping out was effected in the opposite direction to that as shown by an arrow line P to give a negative cap (C) outwardly projected at the ultimate terminal edge as shown in FIG. 4.

The negative cap (C) was subjected to chemical polishing in the same manner as in Example 1 whereby the copper layer at the ultimate edge on the turned-up portion was eliminated to give a negative cap (D), of which the ultimate terminal edge was as shown in FIG. 2.

Using the negative caps (A) to (D), there were assembled alkaline cells (A) to (D).

Each of the cells (A) to (D) was cleaned at the surface and allowed to stand at 60° C. under a relative humidity of 90% for 20 or 40 days. Thereafter, an indicator prepared by dissolving cresol red (0.1 part) in a mixture of water (80 parts) and ethanol (20 parts) was dropped at the gasket part on the outer surface of the cell for detection of leakage of the electrolyte; the presence of leakage gave the color change to red.

The results are shown in Table 1 wherein the numeral indicates the number of the cells having leakage in the tested 100 cells.

TABLE 1

| Cell | After 20 days | After 40 days |
| --- | --- | --- |
| B | 12 | 17 |
| D | 5 | 8 |
| A | 72 | 95 |
| C | 55 | 78 |

From the above results, it is understood that the cells (B) and (D) incorporated with negative caps eliminated the copper layer at the ultimate terminal edge on the turned-up portion are superior to the corresponding cells (A) and (C) incorporated with negative caps not eliminated the copper layer in leak-proof property. It is also understood that the cells (D) and (C) incorporated with negative caps having outwardly projected ultimate terminal edges are superior to the corresponding cells (B) and (A incorporated with negative caps not having outwardly projected terminal edges.

What is claimed is:

1. A leak-proof aklaline cell comprising a positive can, a negative cap having a turned-up portion, said cap being fitted at the open end of the positive can and a gasket provided between the positive can and the negative cap, the rim of the positive can being crimped inwardly so as to press the gasket to the negative cap, the negative cap being made of a metal plate laminated with the copper layer which is adapted to be contacted with a negative electrode active material mix and said copper layer also extending to the outer surface of the negative cap facing the gasket, characterized in that the copper layer is eliminated at the ultimate terminal edge of said turned-up portion.

2. The cell according to claim 1, wherein the metal plate is a stainless steel plate.

3. The cell according to claim 2, wherein the negative cap is made of a clad plate comprising a stainless steel plate and a copper layer attached thereto.

4. The cell according to any of claims 1 to 3, wherein the ultimate terminal edge on the turned-up portion is outwardly projected to make a burr and the burr has an acute angle at the top.

5. The cell according to claim 4, wherein the copper layer is tapered near the ultimate terminal edge.

6. The cell according to claim 5, wherein the elimination of the copper layer is effected by chemical polishing.

7. The cell according to claim 6, wherein the chemical polishing is carried out by the use of a solution comprising hydrogen peroxide.

8. A leak-proof alkaline cell comprising a positive can, a negative cap having a turned-up portion, said cap being fitted at the open end of the positive can and a gasket provided between the positive can the negative cap, the rim of the positive can being crimped inwardly so as to press the gasket to the negative cap, the negative cap being made of a metal plate laminated with a copper layer which is adapted to be contacted with a negative electrode active material mix and said copper layer also extending to the outer surface of the negative cap facing the gasket, characterized in that the copper layer is eliminated at the ultimate terminal edge of said turned-up portion and the copper layer is tapered nearly to the ultimate terminal edge.

9. The cell according to claim 8, wherein the elimination of the copper layer is effected by chemical polishing.

* * * * *